(12) United States Patent
Khartabil

(10) Patent No.: US 7,305,681 B2
(45) Date of Patent: Dec. 4, 2007

(54) METHOD AND APPARATUS FOR PROVIDING MULTI-CLIENT SUPPORT IN A SIP-ENABLED TERMINAL

(75) Inventor: Hisham Khartabil, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/393,500

(22) Filed: Mar. 20, 2003

(65) Prior Publication Data

US 2004/0250253 A1 Dec. 9, 2004

(51) Int. Cl.
 *G06F 9/54* (2006.01)
(52) U.S. Cl. ...................... 719/328; 709/227
(58) Field of Classification Search ........ 709/200–257; 719/310–332
 See application file for complete search history.

(56) References Cited

U.S. PATENT DOCUMENTS

| | | | |
|---|---|---|---|
| 6,421,707 B1 | 7/2002 | Miller et al. | |
| 6,438,114 B1 * | 8/2002 | Womack et al. | 370/329 |
| 6,493,324 B1 * | 12/2002 | Truetken | 370/261 |
| 6,615,236 B2 * | 9/2003 | Donovan et al. | 709/203 |
| 6,678,735 B1 * | 1/2004 | Orton et al. | 709/230 |
| 6,985,961 B1 * | 1/2006 | Ramsayer et al. | 709/238 |
| 7,065,752 B2 | 6/2006 | Willard | |
| 7,079,839 B1 | 7/2006 | Papineau | |
| 7,092,703 B1 | 8/2006 | Papineau | |
| 2001/0024951 A1 | 9/2001 | Rignell et al. | |
| 2002/0037735 A1 | 3/2002 | Maggenti et al. | |
| 2002/0052214 A1 | 5/2002 | Maggenti et al. | |
| 2002/0055366 A1 | 5/2002 | Maggenti et al. | |
| 2002/0058523 A1 | 5/2002 | Maggenti et al. | |
| 2002/0061759 A1 | 5/2002 | Maggenti et al. | |
| 2002/0061760 A1 | 5/2002 | Maggenti et al. | |
| 2002/0061761 A1 | 5/2002 | Maggenti et al. | |
| 2002/0061762 A1 | 5/2002 | Maggenti et al. | |
| 2002/0068595 A1 | 6/2002 | Maggenti et al. | |
| 2002/0077136 A1 | 6/2002 | Maggenti et al. | |
| 2002/0086665 A1 | 7/2002 | Maggenti et al. | |
| 2002/0094831 A1 | 7/2002 | Maggenti et al. | |
| 2002/0102999 A1 | 8/2002 | Maggenti et al. | |
| 2002/0131395 A1 * | 9/2002 | Wang | 370/349 |
| 2003/0236892 A1 * | 12/2003 | Coulombe | 709/228 |
| 2004/0034853 A1 | 2/2004 | Gibbons et al. | |
| 2004/0062375 A1 * | 4/2004 | Wang et al. | 379/219 |
| 2004/0107238 A1 * | 6/2004 | Orton et al. | 709/200 |
| 2004/0213209 A1 * | 10/2004 | O'Conner et al. | 370/352 |

FOREIGN PATENT DOCUMENTS

| | | | |
|---|---|---|---|
| EP | 0905943 A2 | | 3/1999 |
| WO | WO 01/91404 A2 | * | 11/2001 |
| WO | WO 03/085911 A1 | * | 10/2003 |
| WO | WO 2004075518 A1 | * | 9/2004 |

OTHER PUBLICATIONS

U.S. Appl. No. 10/393,499, filed Mar. 20, 2003, Khartabil.

(Continued)

*Primary Examiner*—Lewis A. Bullock, Jr.
(74) *Attorney, Agent, or Firm*—Hollingsworth & Funk, LLC

(57) ABSTRACT

A method and apparatus for providing multi-client support in a SIP-enabled terminal involves providing a SIP processing stack on the terminal. The clients connect to the SIP processing stack to communicate client capabilities and to process SIP messages. The SIP processing stack sends and receives SIP messages. Incoming SIP messages are sent to the appropriate client by looking at the client capabilities and the data in the SIP message.

38 Claims, 5 Drawing Sheets

OTHER PUBLICATIONS

U.S. Appl. No. 10/394,591, filed Mar. 21, 2003, Lonnfors et al.
JSR 118 Expert Group, "Mobile Information Device Profile for Java™ 2 Micro Edition", Java Community Process, Released Nov. 5, 2002, pp. i-vi, 49-54, 89-99, and 534.
Appnel, Timothy, "Introducing MIDP 2.0", Dec. 18, 2002.
Oritz, Enrique, "The MIDP 2.0 Push Registry" Jan. 2003.
J. Rosenberg, H. Schulzrinne, G. Camarillo, A. Johnson, J. Peterson, R. Sparks, M. Handley and E. Schooler, *SIP: Session Initiation Protocol*, pp. 1-252, Jun. 2002.

\* cited by examiner

METHOD AND APPARATUS FOR PROVIDING MULTI-CLIENT SUPPORT IN A SIP-ENABLED TERMINAL

FIELD OF THE INVENTION

This invention relates in general to computing and communications devices, and more particularly to a method and apparatus for using the session initiation protocol or analogous protocol in a multi-client arrangement.

BACKGROUND OF THE INVENTION

Personal communication devices are becoming more widely adopted by the public. Personal communication devices such as cellular phones, personal digital assistants, and laptop computers give users a variety of mobile communications and computer networking capabilities. These devices are increasingly able to communicate using a wide variety of digital multimedia formats, include voice, music, video, text messaging, etc.

One important standard that has allowed providing digital multimedia to mobile and other computing devices is the Session Initiation Protocol (SIP). SIP is a signaling protocol that assists digital devices in establishing end-to-end multimedia sessions. SIP provides features that resemble those provided by the Public Switch Telephone Network (PSTN) as well as Internet protocols such as Transmission Control Protocol/Internet Protocol (TCP/IP) and Hypertext Transfer Protocol (HTTP).

SIP operates similarly to HTTP, in that it is a text-based message protocol operating on a well known network port. From the terminal's perspective, SIP is different than HTTP because the terminal must have a listening process to be notified of incoming communications. In contrast, a web browser utilizing HTTP is purely a client—the browsers initiates connections to listening servers at the users request, and does not listen for incoming connections.

As devices such as mobile phones and personal digital assistants (PDAs) become more sophisticated, these devices will allow the users to run more multimedia aware applications simultaneously. It is likely that these applications will utilize the SIP protocol. Therefore, there may be a high degree of redundancy as each application will include its own SIP protocol stack. Having multiple SIP aware applications could cause confusion on the part of the users, as there may be contention for well known TCP/IP listening ports on the device. This contention could lead to errors and the requirement that users specially configure software to work simultaneously. This is disadvantageous because users generally do not understand concepts such as TCP/IP ports, and may cause problems if an alternate, well-known port (such as one for HTTP, or telnet) is selected by the user to receive SIP.

What is needed is a way to provide SIP functionality to multiple client applications on a communications device. The present invention addresses these and other needs, and offers other advantages over prior art approaches.

SUMMARY OF THE INVENTION

To overcome limitations in the prior art described above, and to overcome other limitations that will become apparent upon reading and understanding the present specification, the present invention discloses a method and apparatus for processing the session establishment procedure in a multi-client environment. In one embodiment, a computer implemented method of session establishment processing involves communicating a client capability of each of a plurality of clients to a message processing stack. A message is received at the message processing stack from a network interface. A destination client is determined from the plurality of clients based on the message and the client capabilities. The message is then communicated from the message processing stack to the destination client.

In one arrangement the session establishment procedure includes the session initiation protocol (SIP). The message processing stack may be arranged to start the destination client if the destination client is not running. The client capabilities may be communicated to the message processing stack by examining a description in persistent storage that a client has earlier populated, or may be determined from the clients at runtime. The message processing stack may determine the destination client by examining a SIP message request line, one or more SIP message headers, and a body of the message. This body may be made up of SDP headers.

In another embodiment of the present invention, a method of processing a SIP message on a data processing device involves receiving the SIP message at a SIP processing stack of the data processing device. The SIP processing stack is associated with a pre-determined port of a network interface of the data processing device. A destination client application of the data processing device is selected based on data of the SIP message. A SIP response message is sent from the SIP processing stack to the network interface based on whether selecting the destination client application was successful. The SIP message is communicated from the SIP processing stack to the destination client application.

In accordance with another embodiment of the invention, an apparatus arranged to interface with a network is provided. The apparatus includes a network interface configured to receive a session establishment message from the network, and a data storage for storing client capabilities for a plurality of client applications. The apparatus includes a processor arranged to receive the session establishment message from the network interface, to identify a destination client application from the plurality of client applications based on the session establishment message and the client capabilities of the data storage, and to communicate the session establishment message to the destination client application.

In another embodiment of the present invention, a system for processing a SIP message associated with a network includes a network interface for receiving a SIP message from the network. A SIP processor receives the SIP message from the network interface and determines a destination client for the SIP message. An inter-process communication means facilitates communications between the SIP processor and the destination client. The SIP processor communicates the SIP message to the destination client using the inter-process communication means.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

DETAILED DESCRIPTION OF THE INVENTION

In the following description of the example embodiments, reference is made to the accompanying drawings which form a part hereof, and in which is shown by way of illustration various manners in which the invention may be practiced. It is to be understood that other embodiments may be utilized, as structural and operational changes may be made without departing from the scope of the present invention.

Generally, the present invention provides a method and apparatus for utilizing a shared processing stack for multiple client applications that utilize a common procedure for session establishment. One protocol in particular that can be used for establishing sessions is the Session Initiation Protocol (SIP). Each client establishes a connection used to send and receive SIP messages to and from the SIP processing stack. The clients also communicate their capabilities to the SIP stack. The SIP processing stack receives all incoming SIP messages and forwards the message to the appropriate client based on the message type and the client capabilities. The SIP processing stack can also send outgoing SIP messages, as well as handling multiple request-response exchanges required by SIP. Using a SIP processing stack frees the clients from having to deal with the states and timing of these exchanges.

The primary purpose of session protocols such as SIP is to establish sessions for end-to-end data communications between networked devices. SIP can also be used for such applications as event notifications, instant messaging and presence. One or more of the endpoints may be mobile, e.g. moving from location to location and from network to network. Mobile endpoints include all manner of digital communication devices. Although the present invention is described in terms of SIP, it is appreciated that concepts according to the present invention can be implemented using any form of session establishment procedure, and descriptions of the use of SIP as defined by IETF is provided for purposes of illustration, not of limitation.

In general, digital communication devices are electronic apparatuses that can exchange data with other devices. The data can be transmitted through various communication mediums such as wire, optical fiber, or through the air as electromagnetic or light waves. Increasingly, communication devices include some sort of computing hardware such as a microprocessor. The growth of microprocessor controlled devices has been steadily growing in the field of mobile communication devices (cellular phones, PDAs, etc.). By and large, most mobile communications devices use microprocessors and can therefore be considered mobile data processing devices.

Figure 1:
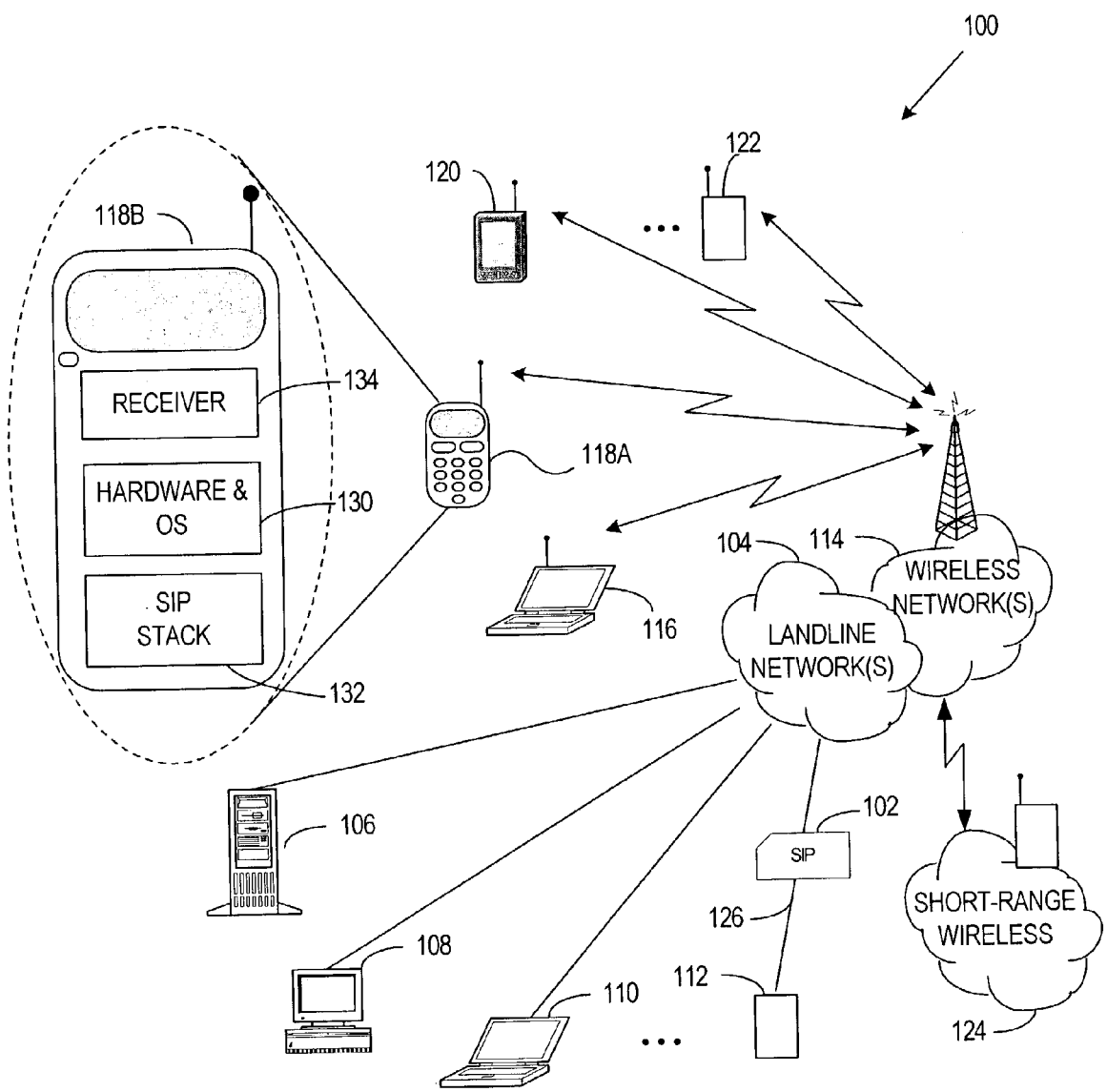
FIG. 1 illustrates a representative system environment in which the principles of the present invention may be employed.

FIG. 1 illustrates a representative system environment 100 in which the principles of the present invention may be employed. In the representative system environment 100, SIP messages 102 may be communicated between devices in any number of known manners. These manners include via a landline network(s) 104, which may include a Global Area Network (GAN) such as the Internet, one or more Wide Area Networks (WAN), Local Area Networks (LAN), and the like. Any computing device or other electronic device that supports SIP messages 102 may be the target system that utilizes the present invention, such as servers 106, desktop computers 108 or workstations, laptop or other portable computers 110, or any other similar computing device capable of communicating via the network 104, as represented by generic device 112.

The data 102 may be provided via one or more wireless networks 114, such as Global System for Mobile Communications (GSM), Universal Mobile Telecommunications System (UMTS), Personal Communications Service (PCS), Time Division Multiple Access (TDMA), Code Division Multiple Access (CDMA), or other mobile network transmission technology. Again, any mobile electronic device that can be used to communicate using SIP can interface with a target system that utilizes concepts according to the present invention, such as laptop or other portable computers 116, mobile phones 118A and other mobile communicators, Personal Digital Assistants (PDA) 120, or any other similar computing device capable of communicating via the wireless network 114, as represented by generic device 122.

The SIP message 102 may be transferred between devices using short-range wireless technologies 124, such as Bluetooth, Wireless Local Area Network (WLAN), infrared (JR), etc. The SIP message 102 can also be distributed using direct wired connections, such as depicted by connection path 126. The present invention is applicable regardless of the manner in which the SIP message 102 is provided or distributed between the target devices.

An example of a target device that utilizes concepts according to the present invention is illustrated as the mobile phone 118B. The device 118B includes, for example, a radio transceiver 134 and hardware (including the processor) coupled to an operating system (OS) 130. The present invention may include a SIP processing stack 132 implemented as firmware, a module, or a program running on the OS 130.

Figure 2:
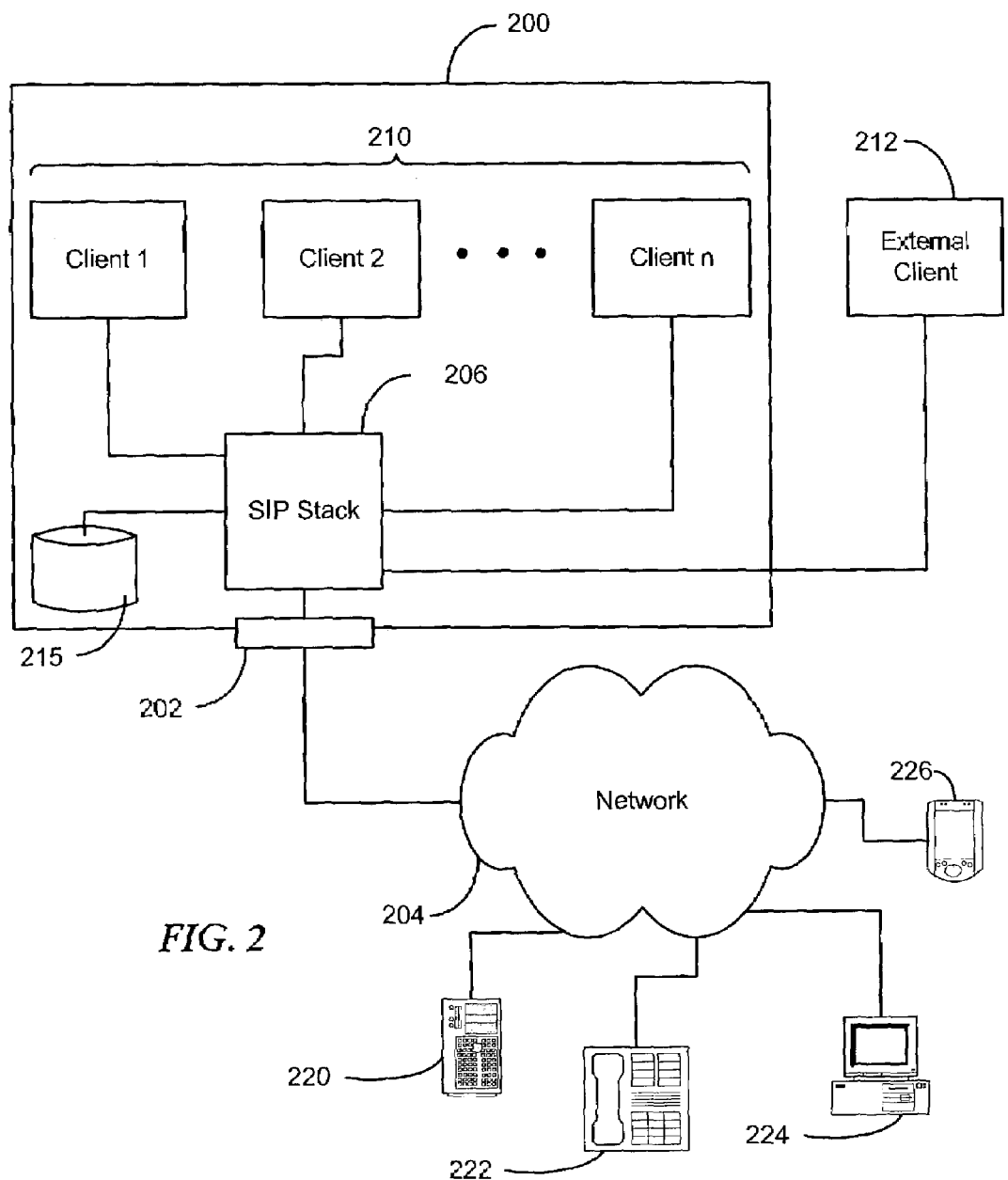
FIG. 2 is a diagram showing an arrangement of a SIP processing stack and client applications according to an embodiment of the present invention.

In reference now to FIG. 2, an example communications device 200 is shown which illustrates concepts of the present invention. The communication device 200 includes a network interface 202 for communication with a network 204. The network 204 can be any type of digital communications network. The network 204 in this example provides some manner of SIP services, typically by having one or more SIP servers 220 and clients 222, 224, 226 on the network 204.

The current version of the SIP specification is defined in Internet Engineering Task Force (IETF) RFC 3261, dated June 2002. RFC 3261 defines the behavior and data formats that can be used by a communication device according to embodiments of the present invention. The SIP specification includes protocols for creating, modifying, and terminating sessions with one or more participants. SIP can also be used for such applications as event notifications, instant messaging and presence. SIP is designed for use with networked data processing devices; therefore a device 200 according to the present invention will deal with SIP communications over the network interface 202.

The network interface 202 may be any physical or logical interface allowing communications with other networked devices. Network interfaces commonly utilize the internet protocol (IP) at the network layer of the International Standards Organization (ISO) networking protocol stack.

Typically coupled with IP are Transmission Control Protocol (TCP) or User Datagram Protocol (UDP) at the transport layer of the OSI stack. It is appreciated, however, that the SIP specification is independent of any type of networking protocols, and may be used with various other network technologies known in the art.

The communications device 200 includes a SIP processing stack 206 (also referred to herein as a "SIP stack") that communicates with the network 204 through the network interface 202. The SIP stack 206 can be arranged to handle all SIP communications for the communications device 200.

The SIP stack 206 also communicates with clients 210 on the communications device 200. Clients 210 (also known as "client applications") are typically applications that are running on the communications device 200. Clients 210 deal with, among other things, formatting and presenting data to the users. A client 210 may include programs handling tasks as voice/video communications, text messaging, web services, etc.

The SIP stack 200 may be configured to communicate with an external client 212 that is not necessarily running on the communications device 200. The external client 212 may be connected to the communications device 200 via a network interface or a data I/O bus, such as used by plug-in peripheral devices. Such peripheral devices may include storage devices such smart cards, PC cards, RAM/ROM modules, disk drives. Autonomous devices such as phones, PDAs, computers, etc. may also be attached to the communication device 200 as peripherals or via a network to interface an external client 212 with the SIP stack 200.

Various techniques known in the art can be used for communications between clients 210, 212 and the SIP processing stack 206. The SIP processing stack 206 and clients 210, 212 may be separately running processes. It is also possible for one or more clients to run in a single process with each other or with the SIP stack 206 by using Light Weight Processes (LWP) or threads. A device 200 according to the present invention may use any combination of separate processes and/or threads of execution within processes. Communications between client processes or threads can be accomplished through Inter-Process Communications (IPC).

IPC mechanisms allow separate processes to interact. Such interaction can be synchronous or asynchronous. Computer architectures offer various methods and mechanisms to facilitate IPC, such as network sockets, shared memory, signals, semaphores, pipes, messaging, etc. Various standard IPC protocols are known in the art, including Java RMI, CORBA, COM/DCOM, Remote Procedure Calls (RPC), etc. Various operating systems and development environments provide specific IPC features, such as IPC within the Symbian Operating System for mobile devices.

IPC protocols often allow programmers to transparently invoke methods on remote processes by making function calls. The processes can define Application Program Interface (API) methods usable by another IPC aware processes. These API methods can be used to initiate events, transfer data, process queries, etc. In reference to FIG. 2, the clients 210, 212 and SIP stack 206 can exchange data related to SIP using predefined API methods.

One type of data exchanged between clients 210, 212 and the SIP stack 206 are client capabilities. These capabilities can be used by the SIP stack 206 for determining a destination client for receiving incoming SIP messages. The capabilities can be communicated to the SIP stack 206 at runtime from the clients 210, 212. The capabilities may also be placed in persistent storage 215 for retrieval at any time by the SIP stack 206.

The SIP stack 206 can also be used to start and stop clients 210, 212 using various mechanisms particular to the operating system incorporated by the device 200. For example, many libraries provide implementations of the standard C language procedures of fork( ) and exec( ). Other ways of starting clients 210, 212 may include invoking system calls to the operating system to start an executable or batch file. Clients can also be stopped by making system calls, or by use of a C function such as kill( ). Automatic starting and stopping of clients 210, 212 advantageously allows the device to conserve memory and processing cycles by only running those clients that are needed for current communication sessions.

Figure 3:
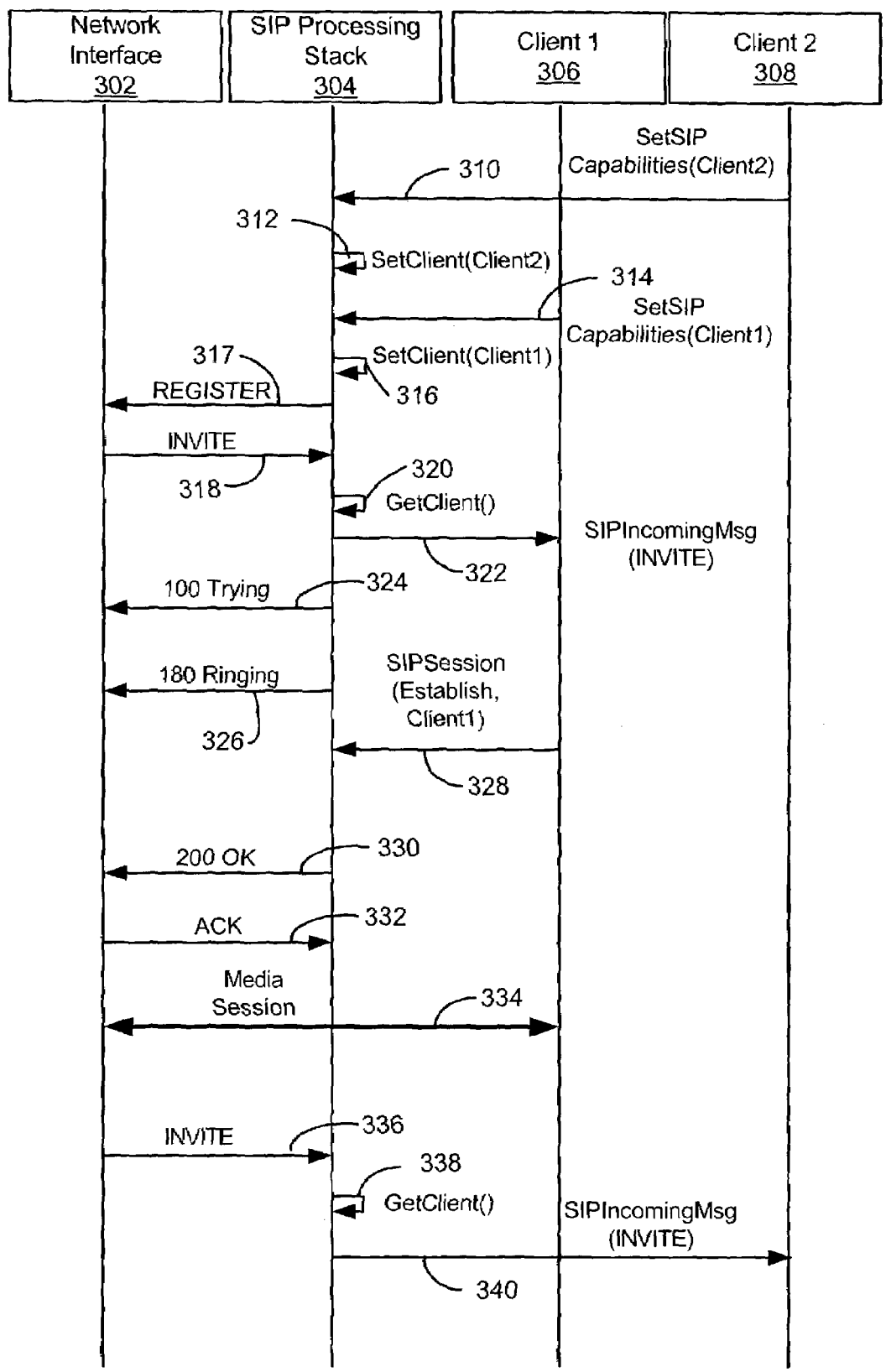
FIG. 3 is a message flow diagram showing sequences of initializing and using the SIP stack according to an embodiment of the present invention.

It is appreciated that the clients 210, 212 may contain their own network connections (not shown) in order to carry out data transfer used during communications. SIP is used along with other protocols, such as the Session Description Protocol (SDP), to provide session-oriented parameters such as data path definition, user availability, and allowable data types supported at both ends of a session. After SIP and SDP (or similar protocols) have established the session, it is up to the clients 210, 212 to perform the functions of transferring data and presenting data to users Referring now to FIG. 3, an example is shown of how a session may be established between a SIP stack 304 and clients 306, 308. A network interface 302 connects the SIP stack 304 and clients 306, 308 to a SIP network (not shown). The client 308 (Client2) first communicates 310 its capabilities to the SIP stack 304. This communication 310 is illustrated in FIG. 3 as an example API call, SetSIPCapabilities( ) invoked from Client2 308. The SIP stack 304 adds 312 this client's capabilities to an internal state, using an example method called SetClient( ). Similar processes of communicating capabilities 314 and adding the client 316 is repeated for Client1 306.

The capabilities communicated between clients 306, 308 and the SIP stack 304 may include standard components of the SIP headers as defined in various IETF RFCs. Well known capabilities supported by clients such as SIP version, SIP methods, language, encoding, content-disposition, media type, content type, etc., are embedded in the SIP message. Other client capabilities can be embedded anywhere in the SIP message, including the start line, headers, and message body. The API utilized by the SIP stack 304 would typically have a flexible way of communicating these capabilities, thereby allowing support for future SIP extensions without changing the API methods.

The communication 310, 314 of client capabilities can occur at any time during operation of a communications device. In one arrangement, the clients 306, 308 may communicate their capabilities just once upon installation of the clients 306, 308. This type of communication may be accomplished by writing data to persistent storage such as a file or system registry. By accessing persistent storage, the SIP stack 304 discovers and sets 312, 316 the current client capabilities on startup, and therefore the clients 306, 308 need not be running. It may also be desirable to have clients 306, 308 dynamically added and removed at run-time. In this scenario, the clients 306, 308 would communicate 310, 314 capabilities upon each client startup and remove those capabilities at client shutdown.

The SIP stack 304 can be arranged to handle all SIP related communications over the network interface 302. For example, the REGISTER request 317 can be sent by the SIP stack 304 to inform SIP related hosts of the current system capabilities. Handling all SIP communications through the SIP stack 304 has numerous advantages. For example, developers of client applications are freed from having to deal with including a SIP stack with each client. Updates and fixes can be applied to the SIP stack alone for the benefit of all client applications. Having a central processing point for SIP messages also reduces potential contention for network resources.

The SIP stack 304 can be used for making outgoing connections using SIP as well as listening for incoming connections. Outgoing connections involve finding and connecting to a host on the network. Listening to incoming connections involves waiting on a predetermined network port for connection attempts. Although the concept of network ports is generally used in reference to TCP/IP and UDP/IP, as used herein the concept of a port refers to any unique identifier used to isolate incoming connections at the transport layer. When used in TCP/IP and UDP/IP, these ports are 16-bit unsigned integers embedded in the protocol headers. TCP and UPD ports may be "well known", such as 5060 used for SIP, or may be some other number prearranged for use by two or more hosts.

When processing incoming connections, the SIP stack 304 maintains an internal state of various client capabilities. This internal state can be used to respond to requests such as the SIP OPTIONS request. The OPTIONS request can be initiated by another user on the SIP network to query capabilities of the user device. The SIP stack 304 can use the stack's internal state to respond to the OPTIONS request with all client capabilities of the current state.

The internal state is also used to direct incoming messages to the appropriate client. An example of an incoming connection is shown by an INVITE message received 318 from the network interface 302. The INVITE message is typically sent by a SIP-aware host on the network in an attempt to initiate a session. The SIP stack 304 analyzes the message and selects 320 the client that best suits the capabilities required to process the INVITE request. This selection 320 is indicated by an example method called GetClient( ).

In this example, the INVITE message is forwarded 322 to Client1 306 through an API call, SIPIncomingMessage( ). Although the term "forward" is often meant to construe the message is sent unchanged, in this context "forward" is meant to indicate that the substantive data is communicated between clients and SIP stack 304. It is appreciated that when using an API, some parts of the data contained in a SIP message may be altered to conform to the API. In general, the forwarding or communicating of SIP messages involves communicating that SIP data required by the API or other IPC arrangement, which may include sending the message unchanged.

The SIP stack 304 may handle various responses of the SIP protocol such as the sending the "100 Trying" 324 and "180 Ringing" 326 in response to the INVITE message. When Client1 306 is ready to establish the session, it communicates 328 this to the SIP stack 304 using an API call such as SIPSession( ). The SIPSession( ) call can be used to communicate establishment, changing, and termination of SIP sessions to the SIP stack 304.

After the SIP stack 304 is informed the session will be established, the required OK response 330 and acknowledgement 332 responses can be sent by the SIP stack 304 to complete the exchange. At this point, Client1 306 establishes 334 a media session via the network interface 302. Other media sessions may be established with Client2 308, as shown by processing another INVITE request 336, selecting the client 338, and forwarding the message 340.

As previously described, the SIP stack 304 will process incoming SIP messages and forward those messages to the appropriate client. The SIP stack 304 may look at various parts of the SIP messages, including the start line and header. Also, the SIP message body may contain data (such as SDP headers) that can be examined by the SIP stack 304 to determine appropriate clients for the SIP message. In another example, the body may contain Extensible Markup Language (XML) tags that provide a schema for classifying the session data. Any combination of SIP message headers, start lines, and message body content may be used by the SIP stack 304 when determining the appropriate destination client for a SIP message.

Figure 4:
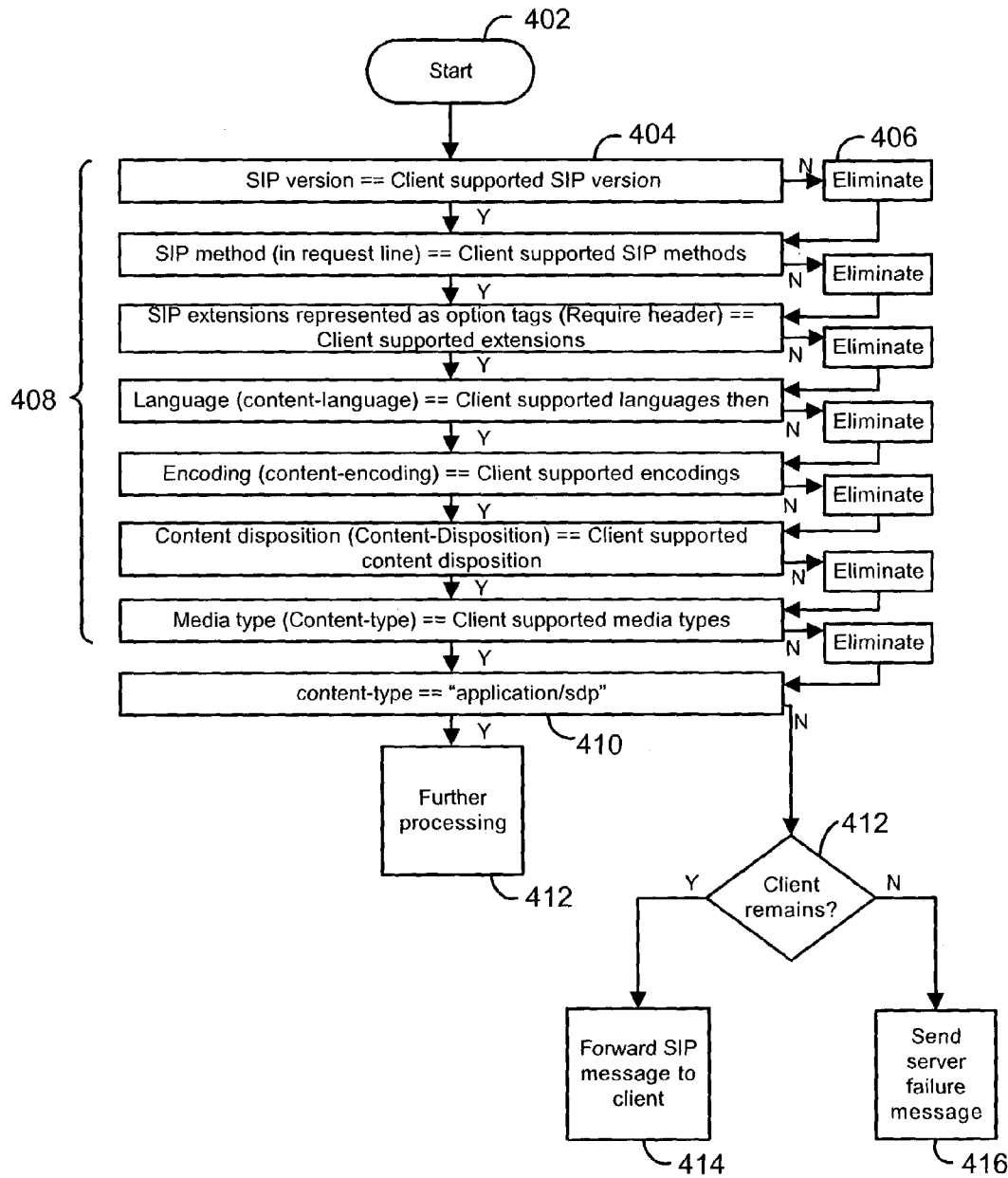
FIG. 4 is a flowchart showing SIP client selection according to an embodiment of the present invention.
Figure 5:
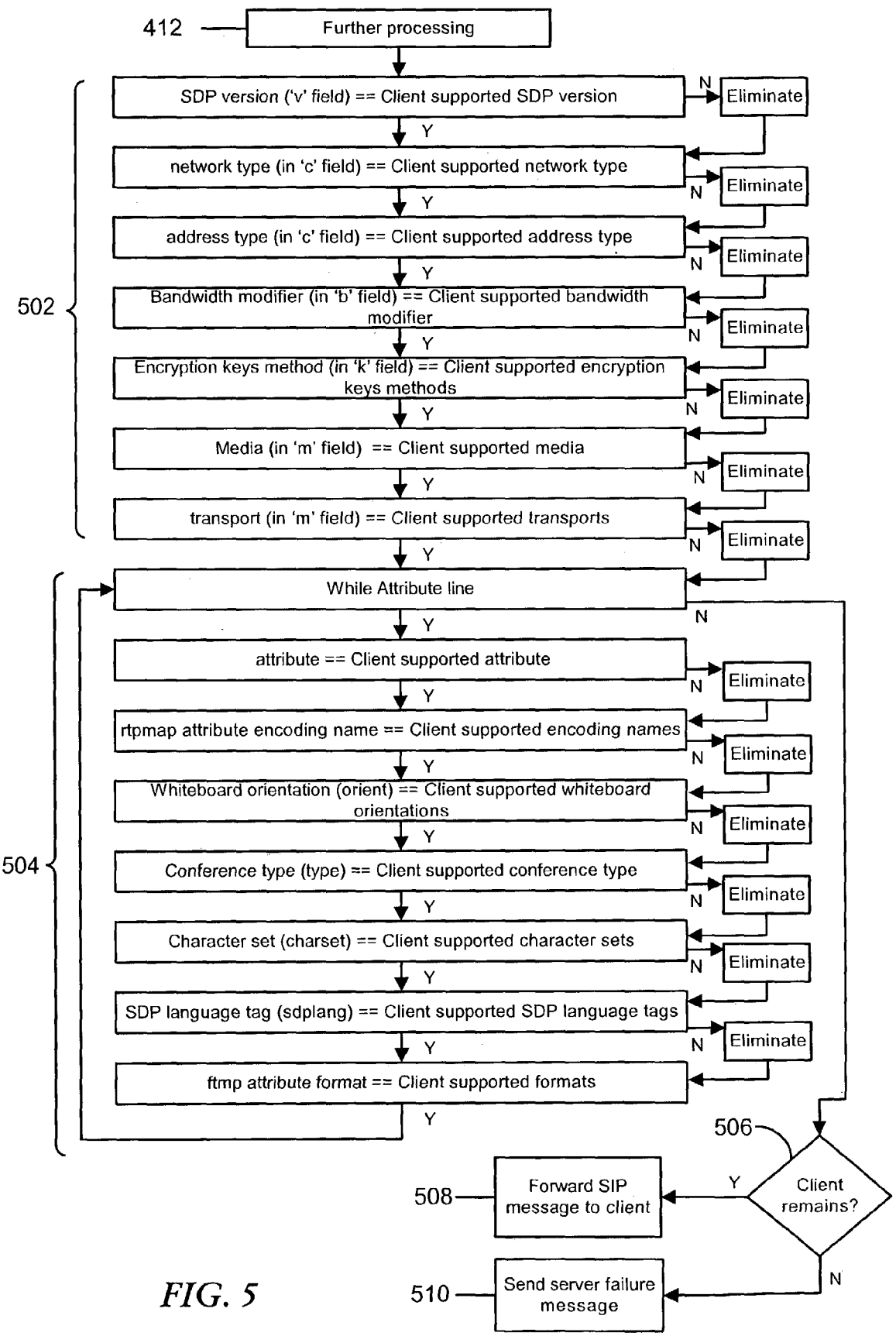
FIG. 5 is a flowchart showing further processing for selecting SIP clients according to an embodiment of the present invention.

FIGS. 4 and 5 illustrate an example of how part of this processing may occur. FIG. 4 is a flowchart showing analysis of various SIP message start line and header values to determine the appropriate client for receiving a message, such as shown in the GetClient( ) procedure 320 in FIG. 3. The procedure starts 402 with the SIP message and a list of all clients and associated capabilities. The SIP version is checked 404 and if any clients do not support this version, the clients are eliminated 406 from the list. This process is repeated over the remaining portion 408 of the procedure by checking for various client capabilities such as SIP methods, SIP extensions, language, etc. Any clients that do not support the tested capability are removed from the list. Finally, the content type is tested 410 and if not type SDP, then the message can be forwarded to the client. In order to forward the message, the list is first checked 412 to see if any clients remain. If so, the message is forwarded to the client 414, otherwise an error message is sent back 416 to the network. If the content type is examined 410 and found to be of type SDP, further processing 412 is required.

FIG. 5 is a flowchart showing the continued processing 412 indicated in FIG. 4. As with the flowchart in FIG. 4, procedures 502 involve testing various fields in the SDP headers such as SDP version, network type, address type, bandwidth modifiers, encryption, media, transport, etc. Any clients in the list that do not support those capabilities indicated in the SDP headers are eliminated. A "while" loop 504 proceeds similarly, testing various attribute lines of the SDP header, such as encoding name, whiteboard orientation, conference type, character set, SDP language, ftmp attribute, etc. Again, any clients in the list that do not support these capabilities are eliminated. After processing in the "while" loop 504, the list of clients is checked 506 to see if any clients remain. If so, the message is forwarded to the client 508, otherwise an error message is sent back 510 to the network.

It is appreciated that the example routines shown in FIGS. 3, 4 and 5 are shown for purposes of illustration, and not of limitation. Various changes may be made to the operations and program flow while still keeping within the spirit of the present invention. The SIP stack may be amenable to an object-oriented approach rather than the procedural approach illustrated. For example, each client could be represented by a client object, and each client object can process the SIP and SDP headers to determine which client should receive the message.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media such as resident memory devices, smart cards or other removable memory devices, or transmitting devices, thereby making a computer program product or article of manufacture according to the invention. As such, "computer readable mediums" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Communication mediums include, but are not limited to, communications via wireless/radio wave communication networks, the Internet, intranets, telephone/modem-based network communication, hard-wired/cabled communication network, satellite communication, and other stationary or mobile network systems/communication links.

From the description provided herein, those skilled in the art are readily able to combine software created as described with appropriate general purpose or special purpose computer hardware to create a data processing device and/or computer subcomponents embodying the invention, and to create a data processing device and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method comprising:
    coupling a plurality of client programs of a communications terminal to a shared message processing stack of the communications terminal via an application program interface (API) of the message processing stack that is accessible by the client programs using an operating system specific interprocess communications facility of the communications terminal, wherein the client programs are capable of simultaneously engaging in multimedia sessions via a network interface of the communications terminal, and wherein the message processing stack processes messages used to establish the multimedia sessions on behalf of the client programs;
    communicating client capabilities of each of the plurality of client programs to the message processing stack using the API of the message processing stack;
    receiving a session establishment message at the message processing stack from the network interface;
    determining a destination program from the plurality of client programs based on the session establishment message and the client capabilities; and
    communicating the session establishment message from the message processing stack to the destination program via the API of the message processing stack to facilitate establishing a session on behalf of the destination program.

2. The method of claim 1, further comprising starting the destination program by the message processing stack in response to receiving the session establishment message.

3. The method of claim 1, further comprising stopping the destination program by the message processing stack when a termination of the session is detected.

4. The method of claim 1, wherein communicating the client capabilities to the message processing stack comprises storing the client capabilities in persistent data storage of the communications terminal.

5. The method of claim 1, wherein communicating the client capabilities to the message processing stack comprises communicating the client capabilities at a run-time of at least one of the plurality of client programs.

6. The method of claim 1, wherein the session establishment message comprises a session initiation protocol (SIP) message, and wherein determining the destination program comprises examining a SIP header of the SIP message.

7. The method of claim 1, wherein the session establishment message comprises a session initiation protocol (SIP) message, and wherein determining the destination program comprises examining a SIP start line of the SIP message.

8. The method of claim 1, wherein the session establishment message comprises a session initiation protocol (SIP) message, and wherein determining the destination program comprises examining a body of the SIP message.

9. The method of claim 8, wherein determining the destination program comprises examining a Session Description Protocol (SDP) header within the body of the SIP message.

10. The method of claim 1, further comprising:
    receiving a session initiation protocol (SIP) OPTIONS message at the message processing stack; and
    responding to the SIP OPTIONS message from the message processing stack on behalf of the plurality of client programs based on a combination of the client capabilities.

11. A computer-readable storage medium having instructions stored thereon which are executable by a communications terminal to perform the steps comprising:
    coupling a plurality of client programs of the communications terminal to a shared message processing stack of the communications terminal via an application program interface (API) of the message processing stack that is accessible by the client programs using an operating system specific interprocess communications facility of the communications terminal, wherein the client programs are capable of simultaneously engaging in multimedia sessions via a network interface of the communications terminal, and wherein the message processing stack processes messages used to establish the multimedia sessions on behalf of the client programs;
    communicating client capabilities of each of the plurality of client programs to the message processing stack using the API of the message processing stack;
    receiving a session establishment message at the message processing stack from the network interface;
    determining a destination program from the plurality of client programs based on the session establishment message and the client capabilities; and
    communicating the session establishment message from the message processing stack to the destination program via the API of the message processing stack to facilitate establishing a session on behalf of the destination program.

12. A method, comprising:
    coupling a plurality of Session Initiation Protocol (SIP) programs of a communications terminal to a SIP processing stack of the communications terminal via an application program interface (API) of the SIP processing stack that is accessible by the client programs using an operating system specific interprocess communications facility of the communications terminal, wherein the SIP processing stack processes all messages used to establish the multimedia sessions on behalf of the SIP programs;

communicating a respective client capability from each of the SIP programs to the SIP processing stack using the API of the SIP processing stack;

receiving the SIP message from a network entity at a pre-determined port of the network interface, wherein the pre-determined port of the network interface is associated with the SIP processing stack;

selecting a destination SIP program from the plurality of SIP programs based on data of the SIP message and a capability of the destination program; and facilitating establishing a SIP session between the destination SIP program and the network entity via the SIP processing stack.

13. The method of claim 12, further comprising starting the destination SIP program by the SIP processing stack in response to receiving the SIP message.

14. The method of claim 12, further comprising stopping the destination SIP program by the SIP processing stack in response to detecting a termination of the SIP session.

15. The method of claim 12, wherein communicating the respective client capability from each of the SIP programs to the SIP processing stack comprises storing the respective client capability in persistent data storage of the communications terminal.

16. The method of claim 12, wherein communicating the respective client capability from each of the SIP programs to the SIP processing stack comprises communicating the respective client capability at a run time of at least one of the SIP programs.

17. The method of claim 12, wherein selecting a destination SIP program comprises examining one or more of a SIP header and a SIP start line of the SIP message.

18. The method of claim 12, wherein selecting a destination SIP program comprises examining a body of the SIP message.

19. The method of claim 12, further comprising:
receiving a SIP OPTIONS message at the SIP processing stack; and
responding to the SIP OPTIONS message from the SIP processing stack on behalf of the plurality of SIP programs based on a combination of the client capabilities.

20. An apparatus comprising:
a network interface;
a processor coupled to the network interface; and
memory coupled to the processor and comprising:
a plurality of client programs capable of simultaneously engaging in multimedia sessions via the network interface; and
a shared message processing stack having an application program interface (API) that is accessible by the client programs using an operating system specific interprocess communications facility of the apparatus, wherein the message processing stack processes messages used to establish the multimedia sessions on behalf of the client programs, and wherein the message processing stack has instructions that cause the processor to:
receive client capabilities of each of the plurality of client programs via the API;
receive a session establishment message from the network interface;
determine a destination program from the plurality of client programs based on the session establishment message and the client capabilities; and
communicate the session establishment message to the destination program via the API of the message processing stack to facilitate establishing a session on behalf of the destination program.

21. The apparatus of claim 20, wherein the message processing stack has instructions that cause the processor to start the destination program in response to receiving the session establishment message.

22. The apparatus of claim 20, wherein the message processing stack has instructions that cause the processor to stop the destination program in response detecting a termination of the session.

23. The apparatus of claim 20, wherein the message processing stack comprises a program running independently of the client programs.

24. The apparatus of claim 20, wherein the memory comprises persistent data storage, and wherein the message processing stack includes instructions that cause the processor to receive the client capabilities of at least of the one client programs from the persistent data storage.

25. The apparatus of claim 20, wherein the message processing stack has instructions that cause the processor to receive the client capabilities of at least of the one client programs at a runtime of the at least one client program.

26. The apparatus of claim 20, wherein the session establishment message comprises a session initiation protocol (SIP) message, and wherein the message processing stack determines the destination program by examining at least one of a SIP start line and a SIP header of the SIP message.

27. The apparatus of claim 20, wherein the session establishment message comprises a session initiation protocol (SIP) message, and wherein the message processing stack determines the destination program by examining a body of the SIP message.

28. The apparatus of claim 20, wherein the message processing stack has instructions that further cause the processor to:
receive a SIP OPTIONS message from the network interface; and
responding to the SIP OPTIONS message on behalf of the plurality of client programs based on a combination of the client capabilities.

29. An apparatus, comprising:
a network interface;
a processor coupled to the network interface; and
memory coupled to the processor and comprising:
a plurality of Session Initiation Protocol (SIP) programs capable of simultaneously engaging in multimedia sessions via the network interface;
a SIP processing stack having an application program interface (API) that is accessible by the client programs using an operating system specific interprocess communications facility of the apparatus, wherein the message processing stack receives SIP messages used to establish the multimedia sessions on behalf of the client programs via a predetermined port of the network interface that is associated with the SIP processing stack, and wherein the message processing stack has instructions that cause the processor to:

receive client capabilities of each of each of the SIP programs via the API of the SIP processing stack;

receive a SIP message from a network entity at the pre-determined port of the network interface;

select a destination SIP program from the plurality of SIP programs based on data of the SIP message and the client capabilities; and facilitate establishing a SIP session between the destination SIP program and the network entity via the SIP processing stack.

30. The apparatus of claim 29, wherein the SIP processing stack has instructions that cause the processor to start the destination program in response to receiving the session establishment message.

31. The apparatus of claim 29, wherein the SIP processing stack has instructions that cause the processor to stop the destination program in response to detecting a termination of the SIP session.

32. The apparatus of claim 29, wherein the SIP processing stack comprises a program running independently of the SIP programs.

33. The apparatus of claim 29, wherein the memory comprises persistent data storage, and wherein the SIP processing stack includes instructions that cause the processor to receive the client capabilities of at least of the one SIP programs from the persistent data storage.

34. The apparatus of claim 29, wherein the SIP processing stack includes instructions that cause the processor to receive the client capabilities of at least of the one SIP programs at a run time of the at least one SIP program.

35. The apparatus of claim 29, wherein the SIP processing stack determines the destination SIP program by examining at least one of a SIP header and a SIP start line of the SIP message.

36. The apparatus of claim 29, wherein the SIP processing stack determines the destination SIP program by examining a body of the SIP message.

37. The apparatus of claim 29, wherein the SIP processing stack has instructions that furthers cause the processor to:

receive a SIP OPTIONS message from the network interface; and responding to the SIP OPTIONS message on behalf of the plurality of client programs based on a combination of the client capabilities.

38. A communications terminal comprising:

means for coupling a plurality of client programs of a communications terminal to a shared message processing stack of the communications terminal via an application program interface (API) of the message processing stack that is accessible by the client programs using an operating system specific interprocess communications facility of the communications terminal, wherein the client programs are capable of simultaneously engaging in multimedia sessions via a network interface of the communications terminal, and wherein the message processing stack processes messages used to establish the multimedia sessions on behalf of the client programs;

means for communicating client capabilities of each of the plurality of client programs to the message processing stack using the API of the message processing stack;

means for receiving a session establishment message at the message processing stack from the network interface;

means for determining a destination program from the plurality of client programs based on the session establishment message and the client capabilities; and means for communicating the session establishment message from the message processing stack to the destination program via the API of the message processing stack to facilitate establishing a session on behalf of the destination program.

* * * * *

UNITED STATES PATENT AND TRADEMARK OFFICE
CERTIFICATE OF CORRECTION

PATENT NO. : 7,305,681 B2
APPLICATION NO. : 10/393500
DATED : December 4, 2007
INVENTOR(S) : Hisham Khartabil It is certified that error appears in the above-identified patent and that said Letters Patent is hereby corrected as shown below:

In the Specification:

Col. 4, line 29: "infrared (JR)," should read --infrared (IR),--.

Signed and Sealed this

Twenty-ninth Day of April, 2008

JON W. DUDAS
*Director of the United States Patent and Trademark Office*